Oct. 21, 1941.　　　V. ROLAIN　　　2,259,585
RECORD RESURFACING MACHINE
Filed Feb. 24, 1940
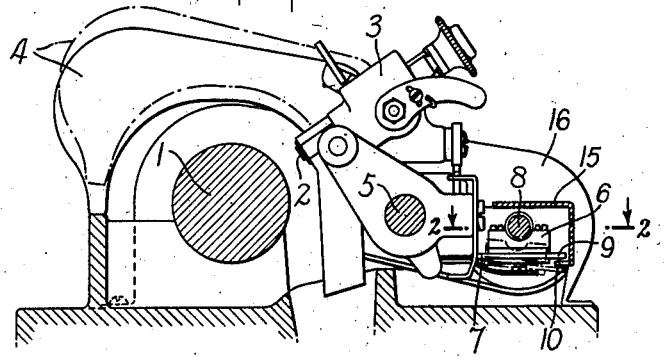
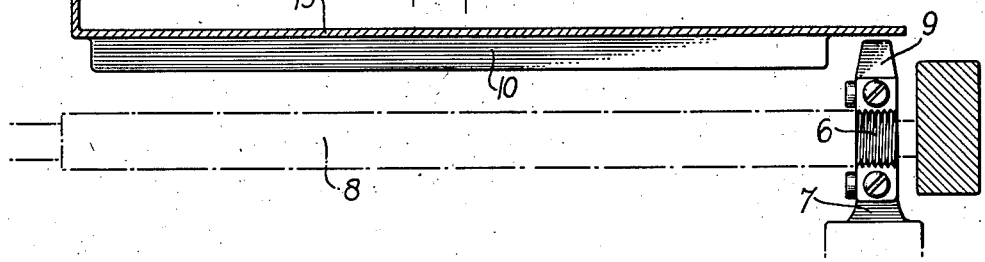
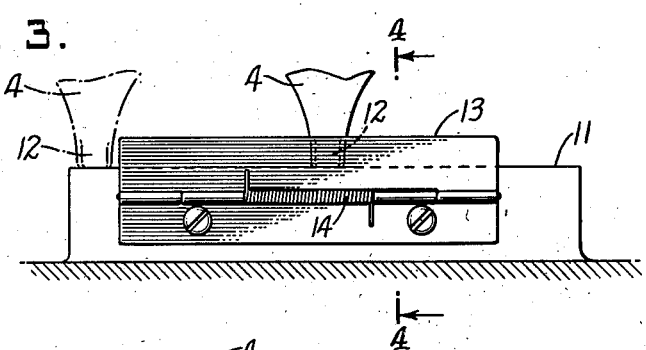
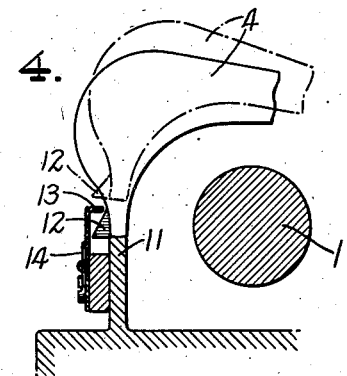
INVENTOR
*Vaughn Rolain*
BY
*Blair, Curtis & Hayward*
ATTORNEYS Patented Oct. 21, 1941

2,259,585

UNITED STATES PATENT OFFICE 2,259,585

RECORD RESURFACING MACHINE

Vaughn Rolain, Green Bay, Wis., assignor to Dictaphone Corporation, New York, N. Y., a corporation of New York Application February 24, 1940, Serial No. 320,581

7 Claims. (Cl. 82—1.1)

The present invention relates to machines for resurfacing records of the kind commonly used with dictating machines. One type of resurfacing machine in general use is illustrated in the Frykman Patent No. 1,740,425, for example, wherein the record to be resurfaced is placed on a rotatable mandrel and a resurfacing tool is fed along the record in a direction parallel to its longitudinal axis. A guide rod mounted with its longitudinal axis parallel with that of the mandrel supports a tool carrier which is mounted on said rod to slide longitudinally and to tilt transversely thereon. The carrier is fed along the rod with a resurfacing tool in cutting engagement with the record by means of a feed nut mounted on said carrier and which engages a feed screw having its axis parallel with the axes of the mandrel and the guide rod. A weighted extension of the tool carrier rides freely upon a guide rail to maintain the tool carrier in position to hold the feed nut in engagement with the feed screw and the resurfacing tool in engagement with the record to be resurfaced.

In a cycle of operation of a machine of the kind above described, the tool carrier is manually brought to position at the starting end of its course and tilted to move the feed nut mounted thereon into operative engagement with the feed screw. In this position of the carrier, the extension thereof rides on the guide rail and said carrier and the resurfacing tool are advanced by operation of said feed screw from one end to the other of the record. The feed nut is then disengaged from the feed screw by manually tilting the carrier to lift said weighted extension from the guide rail. With the parts thus disengaged, the carrier and the feed nut are returned to the beginning position and, after reengagement of said nut with said feed screw as above described, the cutting or resurfacing operation is repeated.

Resurfacing machines of the type above mentioned are often injured and their usefulness impaired by careless operation. For example, some operators attempt to return the carrier to starting position without wholly disengaging the feed nut from the feed screw, or they will reengage the feed nut with the feed screw before the carrier has reached its extreme beginning position. Again, operators will negligently reengage the feed nut with an intermediate portion of the feed screw so that the cutting tool will be brought down upon the surface of the record instead of in advance of its exposed end. In the first cited instance of careless operation, the delicately adjusted parallelism of the mandrel, feed screw, and guide rod is impaired and the threads of the screw and nut are injured or destroyed. In the second case, the record is not properly resurfaced and the cutting tool is injured.

One object of the present invention is to protect the machine against the above described misuses and abuses. This is secured in part by providing suitable means for normally preventing engagement and disengagement of the feed nut and the feed screw except at extreme end positions of the carrier. A further improvement contemplates adjustment or control of said means whereby engagement and/or disengagement of the nut and screw may be made, if desired, at any part of the traverse of the carrier. Other advantages residing in the improved construction will be apparent from the following description of one embodiment and a modification thereof shown in the appended drawing wherein—

Fig. 1 is a view in transverse vertical section, the full line showing of the tilting parts illustrating their relative positions during cutting movement or translation of the tool carrier, and the dotted line showing indicating the position of the same parts when the carrier is tilted and the feed nut is disengaged from the feed screw, as during return movement of the tool carrier;

Figure 2, a horizontal longitudinal section on the line 2—2 of Figure 1;

Figure 3, a modification wherein the devices for controlling engagement and disengagement of the feed nut and feed screw are arranged to cooperate with the tool carrier extension and are adjustable into and out of operative position; and Figure 4 is a transverse vertical section on the line 4—4 of Figure 3.

Referring to the drawing, the resurfacing machine there illustrated and to which the present invention has been applied, includes a mandrel 1 upon which may be mounted a record (not shown) to be resurfaced by a tool or cutter 2 mounted on a tool carrier which includes a tool holder 3 and a weighted extension 4, said carrier being slidably and tiltably mounted on a guide rod 5.

A feed nut 6 is mounted on the carrier by devices more clearly shown in Renholdt's Patent No. 2,181,643. For the purposes of the present application, it is sufficient to mention a bracket 7 extending from said carrier and adapted to support the feed nut 6 underneath the feed screw 8. When the carrier is tilted to the dotted line position, Figure 1, nut 6 swings downwardly to disengage itself from feed screw 8 and when the carrier is tilted back to full line position nut 6 swings upwardly to reengage said screw.

According to the present invention, these movements of engagement and disengagement are desirably restricted for the reasons above set forth. Devices for this purpose, as shown in Figures 1 and 2 include the bracket 7 which has a projecting end 9. A guard 15 projects to the right, Figure 2, from a gear housing 16 and provides a stop member in the form of a flange 10 which extends parallel with and below the level of the feed screw 8. Said flange 10 arrests or stops angular movement of the projecting end 9 when the carrier is tilted at any portion of its traverse, except its extreme end positions, or where end 9 clears the ends of flange 10. The feed nut 6 is therefore free to engage and disengage the feed screw 8 only at the starting and finishing ends respectively of said screw. In operation, with nut 6 engaging screw 8, the carrier advances sufficiently for the cutting tool to engage the record to be resurfaced and the projecting end 9 of bracket 7 comes to a position overlying the stop flange 10 and continues in this position until the carrier and tool have traversed the entire length of the record, or until the feed nut reaches the finishing end or position at the left hand of Figure 2. In this position, the carrier may be tilted so as to swing said projecting end 9 below the level of the flange 10, as indicated in dotted lines in Figure 1. After a slight return movement toward the right, said projecting end 9 is brought underneath the flange 10, or in such relation thereto as to prevent the feed nut 6 from moving into engagement with the feed screw 8 until the carrier is again returned to its beginning position, at the extreme right as shown in Figure 2.

In the modification shown in Figures 3 and 4, the weighted extension 4 which rides freely on guide rail 11, is provided with a detent 12 cooperating with an outwardly yielding stop flange 13 supported in front of said guide rail and in position to be engaged by the inclined front edge of said detent 12 when extension 4 is tilted upwardly and by the bottom edge of said detent 12 when extension 4 is tilted downwardly along with the above described tilting of the carrier to engage and disengage the feed nut and the feed screw. Flange 13 is held yieldingly in operative position by a spring 14.

During feeding movement of the carrier and the cutting tool, the parts occupy the relative positions shown in Figure 4. At the end of the cutting movement, the extension 4 of the carrier comes to the dotted line position shown in Figure 3, that is with the detent 12 located beyond and clear of the left end of flange 13. In this position, extension 4 is lifted manually to tilt the carrier and thus disengage nut 6 from feed screw 8; and the carrier is then moved toward the right into its beginning position. During this movement, the extension 4 and detent 13 may occupy the dotted line position shown in Figure 4, that is, with detent 12 riding upon or above flange 13. If for any reason it is desirable or necessary to reengage nut 6 with feed screw 8 at an intermediate portion of said screw between the end positions of said nut thereon, the flange 13 may be deflected against spring 14 sufficiently to permit the return or downward movement of extension 4 and detent 12, so that the end of said extension will again ride upon the upper surface of guide rail 11. Obviously, a similar result may be obtained by any suitable expedient whereby in effect the detent or the flange 13 is adjustable to permit the described return tilt or swing of the extension 4 of the carrier.

The modified construction also permits disengagement of the feed nut from the feed screw by tilting the carrier when the nut is in a position between the ends of the feed screw. When this occurs the inclined edge of detent 12 rides against and deflects the stop flange 13 which returns to normal stop position by operation of spring 14 thus preventing accidental or unintended reengagement of the nut with an intermediate portion of the feed screw.

As many embodiments might be made of the above invention, and as many changes might be made in the embodiment above described, it is to be understood that all structure hereinbefore described as shown in the accompanying drawing is to be considered as illustrative only and not in a limiting sense.

I claim:

1. In a record resurfacing machine wherein a record to be resurfaced is supported to rotate about its central longitudinal axis and a tool carrier is mounted to transport a resurfacing tool in cutting engagement with said record from one end position to another along a path parallel to said axis, the combination of a feed screw, a feed nut mounted on said carrier and movable into and out of engagement with said feed screw, and means cooperating with a portion of said carrier and positioned and adapted to arrest screw engaging and disengaging movements of said feed nut between said end positions of the tool carrier.

2. In a record resurfacing machine wherein a record to be resurfaced is supported to rotate about its central longitudinal axis and a tool carrier is mounted to transport a resurfacing tool in cutting engagement with said record from one end position to another along a path parallel to said axis, the combination of a feed screw, a feed nut mounted on said carrier and movable into and out of engagement with said feed screw, and means cooperating with a portion of said carrier and positioned and adapted to arrest screw engaging and disengaging movements of said feed nut between said end positions of the tool carrier, said arresting means being adjustable into and out of arresting position.

3. In a record resurfacing machine wherein a record to be resurfaced is supported to rotate about its central longitudinal axis and a tiltable tool carrier is mounted to transport a resurfacing tool in cutting engagement with said record from one end position to another along a path parallel to said axis, the combination of a feed screw, a feed nut mounted on said carrier and tiltable therewith into and out of engagement with said feed screw, and an elongated stop member arranged parallel with the path of translation of the carrier and adapted to engage a portion thereof to arrest tilting of said carrier when the latter is between said end positions.

4. In a record resurfacing machine wherein a record to be resurfaced is supported to rotate about its central longitudinal axis and a tiltable tool carrier is mounted to transport a resurfacing tool in cutting engagement with said record from one end position to another along a path parallel to said axis, the combination of a feed screw, a feed nut mounted on said carrier and tiltable therewith into and out of engagement with said feed screw, a detent mounted on said carrier, and an elongated stop member arranged parallel with the path of translation of the carrier and in position to be engaged by said detent when said carrier is tilted to or from tool feeding position while said nut is opposite intermediate portions of said screw.

5. In a record resurfacing machine wherein a record to be resurfaced is supported to rotate about its central longitudinal axis and a tiltable tool carrier is mounted to transport a resurfacing tool in cutting engagement with said record from one end position to another along a path parallel to said axis, the combination of a feed screw, a feed nut mounted on said carrier and tiltable therewith into and out of engagement with said feed screw, a detent mounted on said carrier, and a stop member arranged parallel with the path of translation of the carrier and mounted to be deflected by said detent when the carrier is tilted to disengage the nut from an intermediate portion of the feed screw and to arrest tilting movement of said carrier when the latter is tilted in a direction to reengage said nut with said intermediate portion of the feed screw.

6. In a record resurfacing machine wherein a record to be resurfaced is supported to rotate about its central longitudinal axis and a tiltable tool carrier is mounted to transport a resurfacing tool in cutting engagement with said record from one end position to another along a path parallel to said axis, said carrier having a weighted extension at one end and a feed nut at its opposite end, a feed screw arranged and adapted to be engaged and disengaged by said nut, a guide rail for supporting said weighted extension, a stop member mounted on said guide rail, and a detent mounted on the extension and positioned and adapted to engage said stop member to limit tilting of the carrier when said weighted extension is moved toward said guide rail.

7. In a record resurfacing machine wherein a record to be resurfaced is supported to rotate about its central longitudinal axis and a tiltable tool carrier is mounted to transport a resurfacing tool in cutting engagement with said record from one end position to another along a path parallel to said axis, said carrier having a weighted extension at one end and a feed nut at its opposite end, a feed screw arranged and adapted to be engaged and disengaged by said nut, a guide rail for supporting said weighted extension, a guard for said feed screw, a stop member supported by said guard, a detent projecting from said carrier and positioned and adapted to engage said stop member when the carrier is tilted to move said nut into or out of engagement with an intermediate portion of said feed screw.

VAUGHN ROLAIN.